United States Patent [19]
Evert et al.

[11] Patent Number: 5,481,574
[45] Date of Patent: Jan. 2, 1996

[54] SYNCHRONIZATION OF MULTIPLE TRANSMIT/RECEIVE DEVICES

[75] Inventors: Benjamin H. Evert, Bethlehem; Robert H. Vaiden, Allentown, both of Pa.; Edward J. Zimany, Jr., Morristown, N.J.

[73] Assignee: AT&T Corp., Murray Hill, N.J.

[21] Appl. No.: 175,888

[22] Filed: Dec. 30, 1993

[51] Int. Cl.$^6$ ..................................... H04L 7/00
[52] U.S. Cl. ........................... 375/356; 370/105.1
[58] Field of Search .................... 375/356, 354, 375/242, 355; 370/105.1, 105.2, 112, 29; 340/825.65; 327/141, 160

[56] References Cited

U.S. PATENT DOCUMENTS

| | | | |
|---|---|---|---|
| 3,632,882 | 1/1972 | Ciecierski et al. | 370/112 |
| 3,989,889 | 11/1976 | Mendrala | 348/595 |
| 4,234,956 | 11/1980 | Adderley et al. | 375/260 |
| 4,606,023 | 8/1986 | Dragoo | 370/105.3 |

*Primary Examiner*—Stephen Chin
*Assistant Examiner*—Tesfaldet Bocure
*Attorney, Agent, or Firm*—James H. Fox

[57] ABSTRACT

CODECs and various other types of communication devices require timing information to enable them to transmit and receive digital information at the proper time. In the case of multiple CODECs on a single integrated circuit, this has typically required devoting terminals to provide separate transmit and receive frame synchronization pulses for each CODEC. Alternatively, a microprocessor interface may be included so that internal registers can be loaded with transmit and receive timing information. However, that approach limits timing flexibility. In the present invention, a "frame synchronization separation pulse" (FSEP) provides the separation in time between transmit and receive synchronization pulses. In this manner, the number of integrated circuit terminals required for synchronization may be reduced.

16 Claims, 4 Drawing Sheets

SYNCHRONIZATION OF MULTIPLE TRANSMIT/RECEIVE DEVICES

BACKGROUND OF THE INVENTION

1. Field of the Invention

The present invention relates to a technique for communicating information by means of synchronized transmit and receive devices.

2. Description of the Prior Art

Various types of integrated circuits require timing information to enable them to transmit and receive digital information at the proper time. For example, an audio CODEC (COder DECoder) used in telephone systems converts an analog signal from a microphone in a telephone set to a digital signal for transmission over a network, and conversely converts a digital signal from the network to an analog signal that drives an earphone or speaker in the telephone set. Video CODECs that perform comparable functions for video interface devices and digital video networks are also coming into use, along with various types of shared audio-video devices and networks. In most cases, the networks provide synchronous communications to and from the CODECs, so that a defined relationship in time exists between the transmitted digital signals from the devices on the network, and similarly for the received digital signals. Furthermore, a defined time relationship usually exists between the digital signals transmitted from, and received by, a given CODEC. However, it is also usually necessary to be able to change the desired time relationships, as when adding new terminal equipment to the network, or even from one telephone call to the next, as for providing network switching of the calls or for optimum utilization of the time slots available for transmission.

A typical multi-CODEC system is illustrated in FIG. 1. The CODECs 101, 102, 103 and 104 transmit digital signals over a common output line 105, and receive digital signals over a common input line 106. Each CODEC is assigned a time slot for transmission, and a time slot for reception, over the common lines. The transmit frame synchronization pulses, designated FST, provide the CODECs with timing information for transmitting their digitized information. For example, when synchronization pulse FST is received by a given CODEC, that CODEC then sends out a word of digitized information (not shown) to the line 105. In the case of a typical audio CODEC, this is often an 8-bit word, representing $2^{13}$ signal levels (i.e., 13 bits) that are compressed into the 8 bits. Similarly, when a receive frame synchronization pulse FSR is received by a CODEC, that CODEC is activated to accept a word of digitized information from the line 106. In this manner, each CODEC is instructed what portion (i.e., time slot) of a given frame of data to utilize for transmission and reception. The transmit signal TX on output line 105, and the input signal RX on line 106, may be communicated over separate conductors to the network if desired. Alternatively, they may be combined on a single bidirectional conductor, in which case both transmit frames and receive frames are communicated over the same conductor.

In a typical system, a total of 32 (or alternatively 64) time slots are available in a given "frame" of data, as illustrated in FIG. 2. A typical telephone channel is sampled at a rate of 8 kHz, thereby providing a new sample word every 125 microseconds. Therefore, the frame is 125 microseconds in duration. As indicated above, a receive synchronization pulse (FSR) is used to determine which of the 32 receive time slots in a receive frame provides dam to a given CODEC. Similarly, a transmit synchronization pulse (FST) is used to determine which of the 32 transmit time slots in a transmit frame is used for transmitting data from a given CODEC. For example, considering that the synchronization pulses are shown as they travel toward the CODEC (i.e., right to left) in FIG. 1, it can be seen that synchronization pulses $FST_0$ and $FSR_0$ cause CODEC 101 to first transmit a word of information, and thereafter receive a word of information. This is due to the delay $\Delta T$ between FST0 and $FSR_0$. This is also the case for CODEC 102, except that its synchronization pulses ($FST_1$, $FSR_1$) occur earlier in time than those for CODEC 101. On the other hand, CODEC 103 is instructed to transmit a word by synchronization pulse FST2, and to receive a word by synchronization pulse $FSR_2$, at a later time than CODEC 101. The CODEC 104 is instructed to transmit and receive by synchronization pulses $FST_3$ and $FSR_3$ still later in time.

Various time relationships between the transmit and receive synchronization pulses are possible. Since the group of four CODECs shown in FIG. 1 communicate over a common transmit conductor (105) and receive conductor (106), the time delay $\Delta T$ is typically the same for each CODEC. However, the time delay $\Delta T$ may differ from one system design to the next. In fact, $\Delta T$ may differ from one group of CODECs to another, even on the same system, depending on which "backplane" they communicate with. Furthermore, it is not in general necessary for the transmit synchronization pulses (FST) to arrive before the receive synchronization pulses (FSR); rather, the reverse could be the case, depending on system design. In fact, the synchronization pulses could arrive simultaneously in some designs (e.g., $\Delta T=0$), so that the CODECs simultaneously transmitted and received digital signals over the lines 105, 106. Therefore, it is desirable for the CODECs to be able to work with a wide range of $\Delta T$ values.

Providing the synchronization pulses to the CODECs is usually accomplished through dedicated terminals on the integrated circuit containing the CODEC. That is, a first terminal is dedicated to the receive synchronization pulse (FSR), whereas a second terminal is dedicated to the transmit synchronization pulse (FST). However, a trend in integrated circuit design is to include more functionality on a given integrated circuit chip. Therefore, multiple CODECs may be included on a single chip in some cases. This may lead to a problem in packaging the chip, since additional package terminals are required. It is therefore desirable to be able to supply the synchronization pulses to the various CODECs on the chip using a minimum number of terminals. In one design, registers are included on the chip that are loaded with the transmit and receive timing information. These registers may be loaded through a single package terminal. However, the size of the integrated circuit undesirably increases to accommodate the registers. Furthermore, the use of registers may limit flexibility of use in many cases, since appropriate circuitry must be provided for interfacing the registers to a control circuit, such as a microprocessor for example.

SUMMARY OF THE INVENTION

We have invented a technique for providing synchronization of multiple transmit/receive devices. A time slot offset pulse provides a desired separation in time between the transmit and receive time slots. An illustrative embodiment is given for multiple CODECs on a single integrated circuit, wherein the number of package terminals may be reduced.

DETAILED DESCRIPTION

Figure 1:
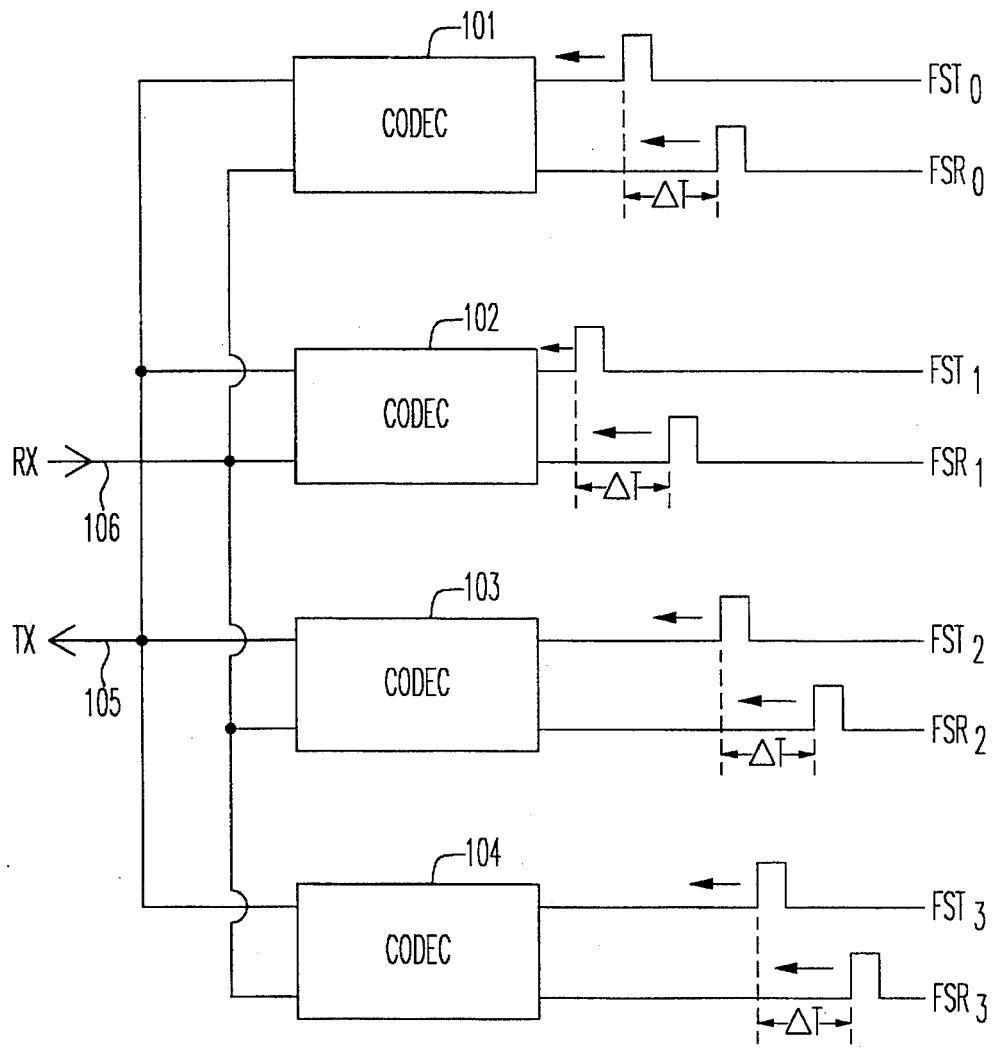
FIG. 1 shows a typical prior-art arrangement for the synchronization of multiple CODECs.
Figure 2:
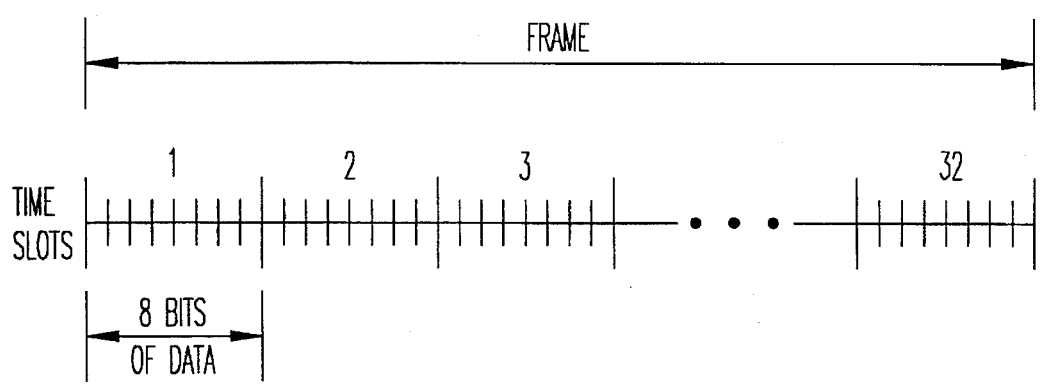
FIG. 2 shows a typical frame of data having multiple time slots.
Figure 3:
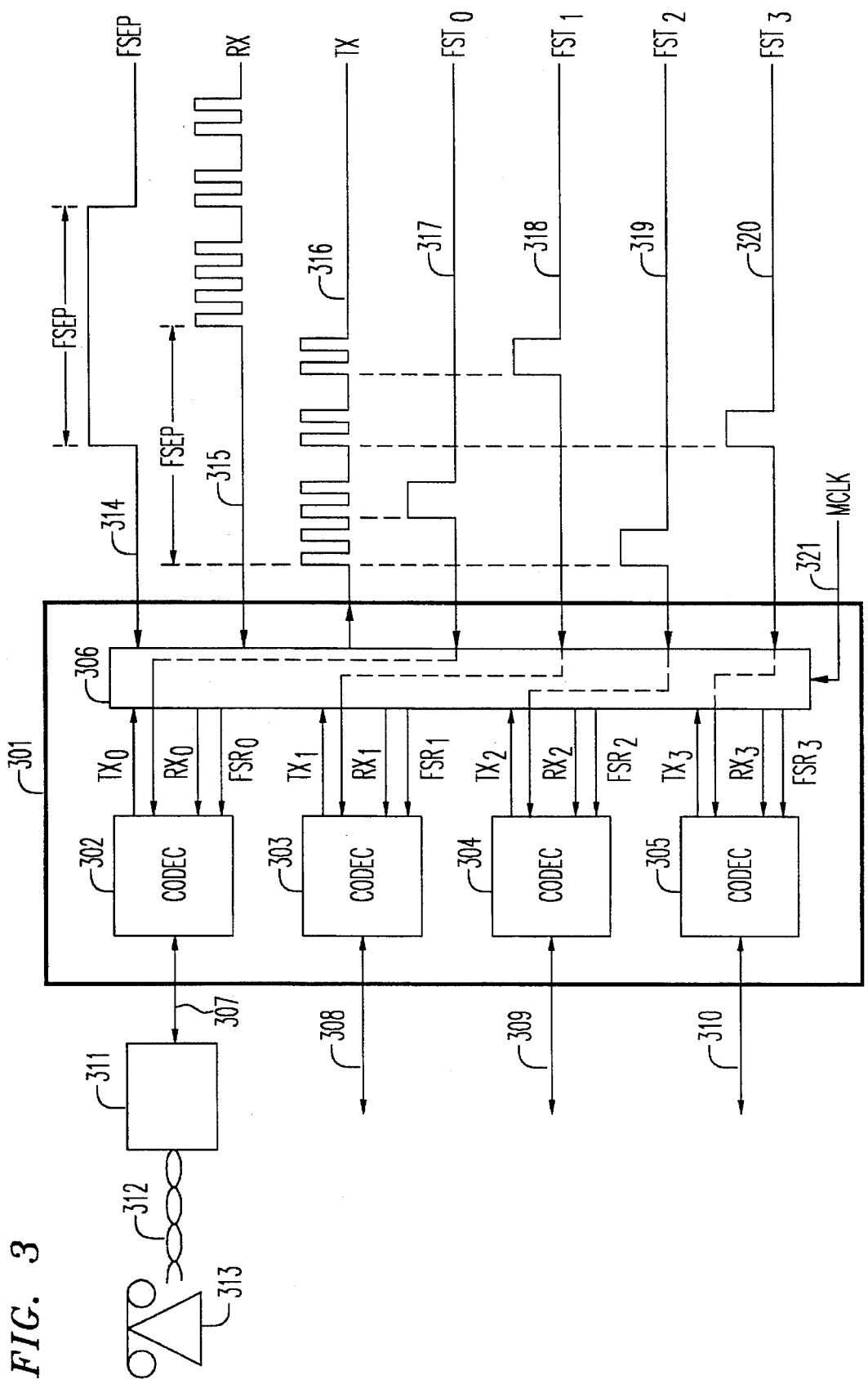
FIG. 3 shows an illustrative embodiment of the invention.

The following detailed description relates to a technique for synchronizing multiple transmit/receive devices. Referring to FIG. 3, an illustrative embodiment of the invention for multiple CODECs on a single integrated circuit (301) is shown, with others being possible. The CODECs (302, 303,304, 305) each receive and transmit an analog signal, illustratively to telephone units. For example, telephone 313 communicates over twisted wire pair 312 to a subscriber line interface circuit 311 (or alternatively a transformer) of a type known in the art, and then over conductor pair 307 to the CODEC 302. Other telephone units (not shown) similarly communicate with the other CODECs. The CODECs may be of any suitable type known in the art. In a typical case, the CODECs perform analog-to-digital conversion using the successive-approximation technique known in the art, and perform digital-to-analog conversion using a resistor ladder technique known in the art, with various alternate techniques being possible.

The analog signals transmitted over lines 307 . . . 310 are converted by CODECs 302 . . . 305, respectively, to digital signals $TX_0$ . . . $TX_3$, respectively, and sent to synchronizing unit 306. The synchronizing unit combines the digital signals by assigning them to the appropriate time slots, shown in simplified pulse form on transmit line 316, for transmission from the integrated circuit 301 to external devices (not shown). These transmit time slots are defined by the corresponding transmit frame synchronization pluses ($FST_0$ . . . $FST_3$) provided to the integrated circuit 301 over the lines 317 . . . 320, respectively, from an external source (not shown). The transmit synchronization pulses are distributed by the synchronizing unit 306 to the individual CODECs 302 . . . 305, respectively. Conversely, the receive line 315 provides a received digital signal (RX) to the synchronizing unit 306 from an external source (not shown). The synchronizing unit directs the digital signals from the receive time slots to the corresponding CODECs over the receive lines $RX_0$ . . . $RX_3$. In practice, the receive lines $RX_0$ . . . $RX_3$ are typically electrically connected together, with the individual CODECs picking off the appropriate receive time slots defined by the receive synchronization pulses $FSR_0$ . . . $FSR_3$, which are provided by the frame synchronizing unit 306.

In the inventive technique, a "frame synchronization separation pulse" (FSEP) separates the receive and trailsmir pulses in time. (For convenience of explanation, the illustrative signals are shown with their corresponding conductor lines in FIG. 3). In the illustrative embodiment of FIG. 3, FSEP is provided from an external source (not shown) to the synchronizing unit 306 by means of line 314. The FSEP has a width (i.e., duration) that determines this time separation. The receive synchronization pulses ($FSR_0$ . . . $FSR_3$) are then generated by the synchronizing unit 306, with each receive synchronization pulse being delayed in time by an amount approximately equal to the duration of FSEP from the corresponding transmit synchronization pulse. This may conveniently be accomplished by counting the duration of FSEP by means of a counter (not shown) that is clocked by the system clock signal MCLK on line 321. The duration of FSEP is then used for the purpose of sending the receive synchronization pulses ($FSR_0$ . . . $FSR_3$) to each of the CODECs 302 . . . 305, respectively, at a defined delay from the corresponding transmit synchronization pulses ($FST_0$ . . . $FST_3$). The resulting receive time slots are shown in simplified pulse form on RX line 315, being delayed from the corresponding TX time slots by approximately the duration of FSEP.

Figure 4:
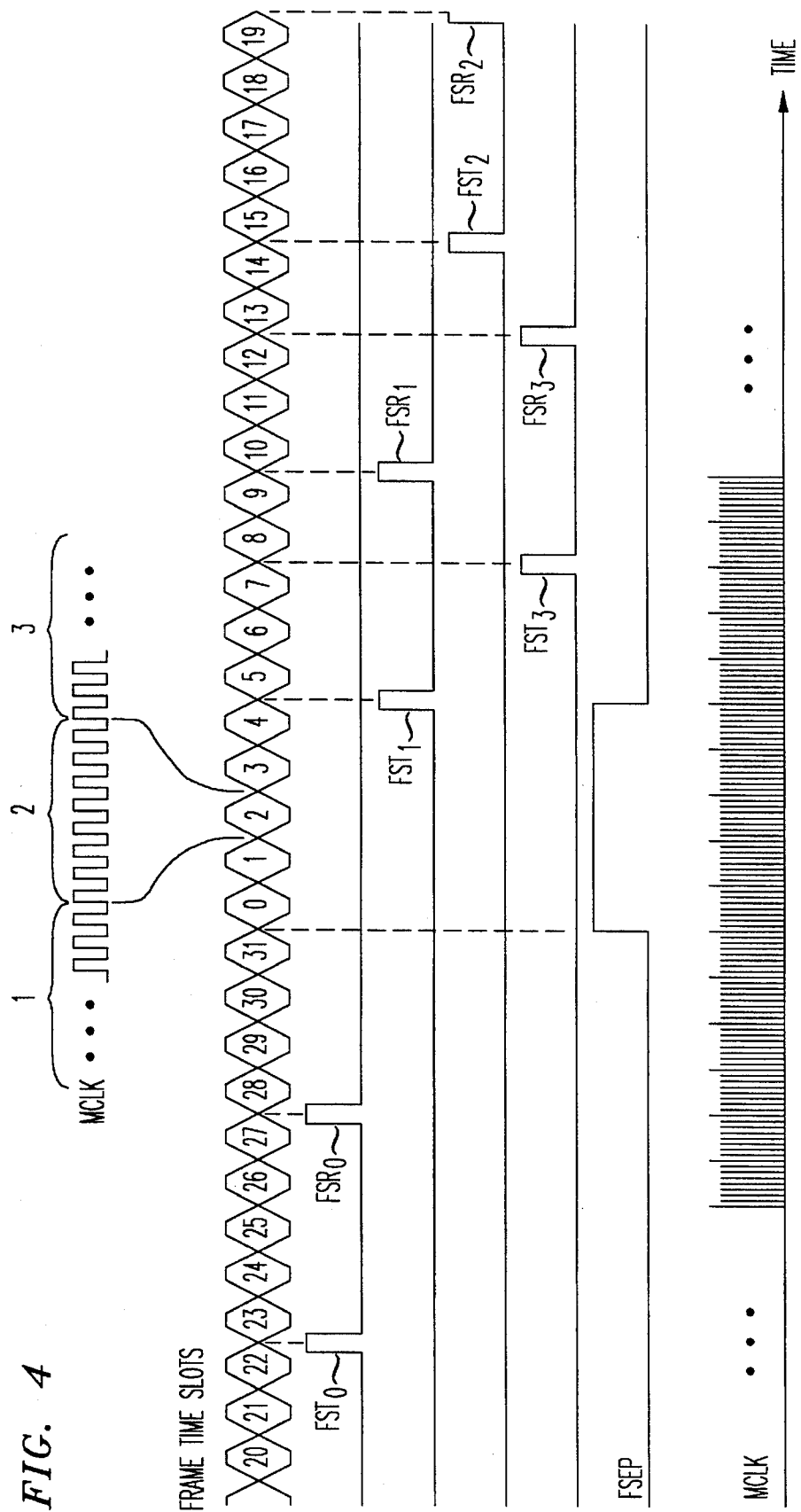
FIG. 4 shows a timing diagram with frame time slots and illustrative pulses.

For example, referring to FIG. 4, a frame of data comprising 32 time slots (0 to 31) is shown, along with the master clock signal MCLK that generates the time slots. (The initial clock pulse in each time slot is shown with exaggerated height, for clarity of illustration.) The duration of the FSEP is determined by counting the number of MCLK clock pulses that occur during the time that FSEP is high. The delay, in clock; periods, of the receive synchronization pulses (FSR) from the corresponding transmit synchronization pulses (FST) is this count minus one in the illustrative case. Therefore, the receive synchronization pulses occur 39 clock periods (40-1) later than the corresponding transmit synchronization pulses. In the illustrative case, if the FSEP is one clock period or less, the synchronizing unit 306 makes the transmit and receive synchronization pulses coincident. Note that the "one" is subtracted from the count in the illustrative case to readily provide for the case of coincident transmit (FST) and receive (FSR) synchronization pulses; i.e., $\Delta T=0$. That is, if FSEP is equal to one MCLK clock pulse (or less), then a given CODEC transmits and receives digital signals simultaneously. However, other modifications to the count of FSEP are possible when determining the delay.

Figure 5:
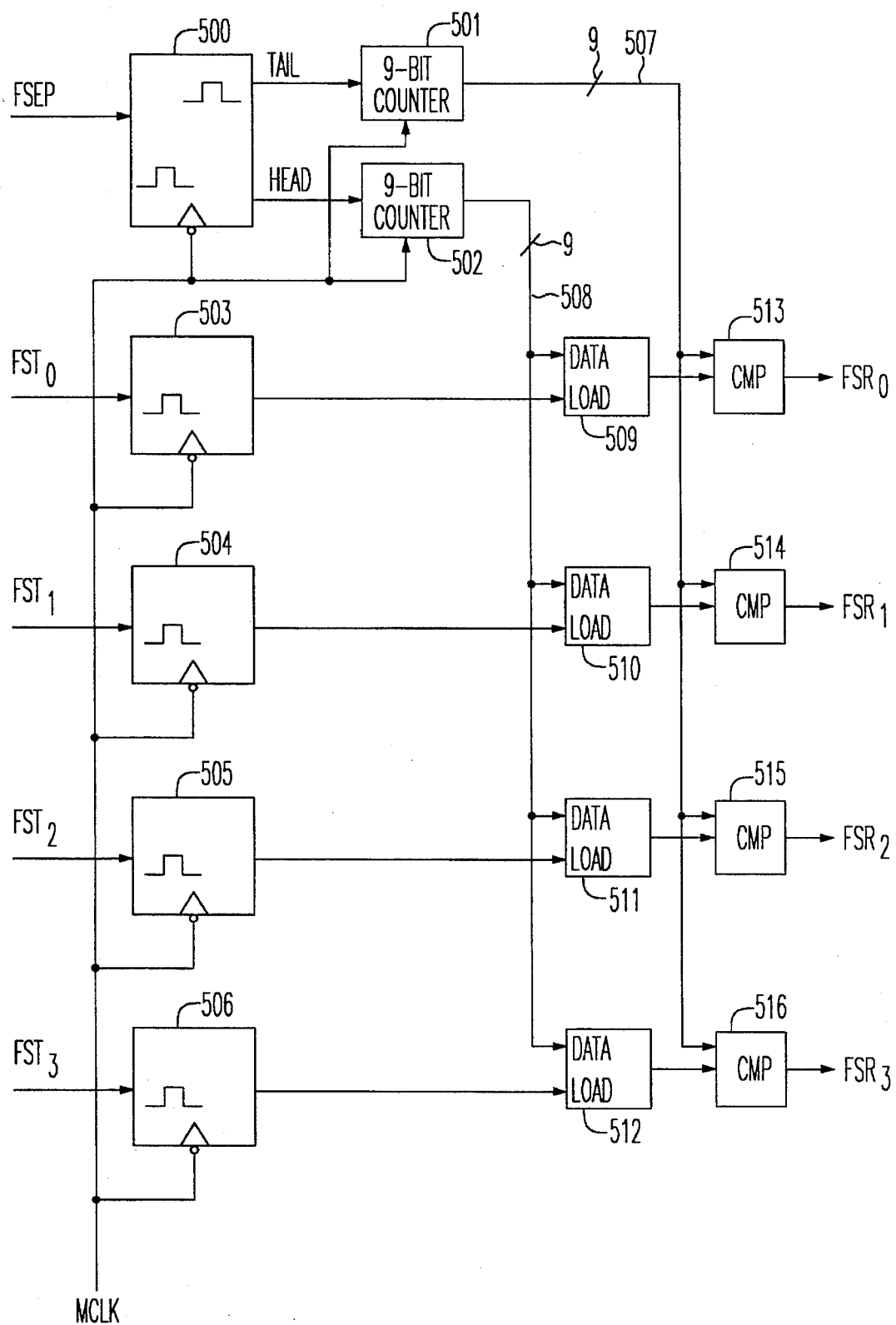
FIG. 5 shows an illustrative implementation of the synchronizing unit.

The frame synchronizing unit 306 may generate the receive synchronization pulses ($FSR_0$ . . . $FSR_3$) from the FSEP by a variety of techniques. A presently preferred embodiment for determining the detiration of FSEP is shown in FIG. 5. The FSEP is applied to pulse generator 500, which generates a first (head) pulse on the rising edge of FSEP, and applies this head pulse to the reset input of the 9-bit counter 502. The pulse generator 500 also generates a second (tail) pulse on the falling edge of FSEP, and applies this tail pulse to the reset input of the 9-bit counter 501. These head and tail pulses are relatively short compared to the length of FSEP. The counters 501 and 502 continually count the clock signal MCLK, and provide the count over 9-conductor busses 507 and 508, respectively. Note that since these counters are reset at the beginning and end of the FSEP, the difference in the count of these counters (i.e., the count in counter 502 minus the count in counter 501) provides the duration of FSEP, as measured in MCLK clock pulses.

The pulse generators 503 . . . 506 generate relatively short head pulses on the rising edge of each of the transmit synchronization pulses ($FST_0$ . . . $FST_3$), and supply these head pulses to the latches 509 . . . 512, respectively. A given transmit synchronization pulse (e.g., $FST_0$) causes a given head pulse to be supplied from a given pulse generator (e.g., 503) to the "load" input of the corresponding latch (e.g., 509), thereby causing the count from the counter 502 to be loaded into that latch (509) through the "data" input. This count is then compared by a comparator (e.g., 513) with the count from the counter 501. When these counts are equal, the comparator sends out the receive synchronization signal (e.g., $FSR_0$). This signal then allows the corresponding CODEC (e.g., 302 in FIG. 3) to receive a time slot of information from the receive line RX. While this circuit implementation of the synchronizing unit is convenient for layout on integrated circuits, numerous other techniques for generating the receive synchronization pulses from the transmit synchronization pulse in accordance with the duration of FSEP are possible.

It can thus be seen that in the illustrative case, four receive synchronization pulses are generated from the FSEP. Hence, the invention saves 3 integrated circuit terminals, allowing four CODECs to fit a standard 28 pin package, for example. While the above illustrative embodiment has generated the receive synchronization pulses from the transmit synchronization pulses using FSEP, it is apparent that the opposite could be the case. That is, the receive synchronization pulses could be supplied to the synchronizing unit 306 from an external source, and the transmit synchronization pulses for each of the CODECs could be generated therefrom by means of the FSEP.

Although the above embodiment has been given in terms of CODECs that interface with telephones, other types of device interfaces are possible. For example, various other types of transducers may advantageously interface with digital-to-analog and analog-m-digital converters, as can various video devices. Furthermore, the input signals to multiple communication devices on a given integrated circuit may already be in digital form, and therefore no conversion between analog and digital signals may be required. The present invention may then be implemented with a synchronizing unit (e.g., 306) on an integrated circuit that provides the synchronization pulses to such devices. The advantages noted above with respect to reduced integrated circuit terminal count may still be obtained in that case. Furthermore, various time-slot interchange applications exit-in the digital art, including, for example, asynchronous transfer mode (ATM) switches and integrated services digital network (ISDN) applications, which may advantageously use the inventive technique.

We claim:

1. An integrated circuit comprising multiple communication devices that each transmit and receive digital signals during time slots defined by receive and transmit synchronization pulses;

characterized in that said integrated circuit further comprise;

first inputs for receiving a given type of said receive and transmit synchronization pulses that define a given type of time slots, and providing said given type of synchronization pulses to the given type of synchronization inputs of said communication devices;

a second input for receiving a frame separation synchronization pulse having a given duration;

and a synchronization unit coupled to said first inputs and said second input for generating the other type of said receive and transmit synchronization pulses that define the other type of time slots, and providing said other type of synchronization pulses to the other type of synchronization inputs of said communications devices.

2. The integrated circuit of claim 1 wherein said communication devices are CODECs.

3. The integrated circuit of claim 1 wherein said synchronization unlit comprised means for receiving a system clock signal and counting the duration of said frame separation synchronization pulse.

4. The integrated circuit of claim 1 wherein the given type of synchronization pulses that are received by said first inputs arc transmit synchronization pulses, and the other type of pulses that are generated by said synchronization unit are received synchronization pulses.

5. The integrated circuit of claim 1 wherein the given type of synchronization pulses that are received by said first inputs are transmit synchronization pulses, and the other type of pulses that are generated by said synchronization unit are transmit synchronization pulses.

6. A communication system including an integrated circuit comprising multiple communication devices that each transmit and receive digital signals during time slots defined by receive and transmit synchronization pulses;

characterized in that said integrated circuit further comprises:

first inputs for receiving a given type of said receive and transmit synchronization pulses that define a given type of time slots, and providing said given type of synchronization pulses to the given type of synchronization inputs of said communication devices;

a second input for receiving a frame separation synchronization pulse having a given duration; and a synchronization unit couple to said first inputs and said second input for generating the other of said receive and transmit synchronization pulses define the other of type of time slots, and providing said other type of synchronization pulses to the other type of synchronization inputs or said communications devices;

and wherein said communication system further comprises means providing said frame separation synchronization pulse.

7. The communication system of claim 6 wherein said communication devices are CODECs.

8. The communication system claim 6 wherein said synchronization unit comprises means for receiving a system clock signal and counting the duration of said frame separation synchronization pulse.

9. The communication system of claim 8 further comprising means for providing said system clock signal.

10. The communication system of claim 6 wherein the given type of synchronization pulses that are received by said first inputs are transmit synchronization pulses, and the other type of pulses that are generated by said synchronization unit are receive synchronization pulses.

11. The communication system of claim 6 wherein the given type of synchronization pulses that are received by said first inputs are receive synchronization pulses, and the other type of pulses that are generated by said synchronization unit are transmit synchronization pulses.

12. A method of communicating digital signals over a communication channel to and from multiple communication devices located on a given integrated circuit, by steps comprising providing receive and transmit synchronization pulses to each of said devices;

characterized in that said providing is accomplished by:

providing to first inputs of said integrated circuit a given type of said receive and transmit synchronization pulses, and coupling said first inputs to the given type of synchronization inputs of said communication devices;

providing to a second input of said integrated circuit a frame separation synchronization pulse having a given duration, and coupling said first inputs and said second inputs to a synchronization unit on said integrated circuit;

generating by said synchronization unit the other type of said receive and transmit synchronization pulses, and coupling said other type of pulses to the other type of synchronization inputs of said devices.

13. The method of claim 12 wherein said communication devices are CODECs.

14. The method of claim 12 wherein said generating comprises the steps of receiving a system clock signal and counting the duration of said frame separation synchronization pulse.

15. The method of claim 12 wherein the synchronization pulses that are provided to said integrated circuit are transmit synchronization pulses, and the pulses that are generated by said integrated circuit are receive synchronization pulses.

16. The method of claim 12 wherein the synchronization pulses that are provided to said integrated circuit are receive synchronization pulses, and the pulses that are generated by said integrated circuit are transmit synchronization pulses.

* * * * *